Jan. 25, 1966

P. T. MATTIMOE 3,231,461

LAMINATED GLAZING UNIT

Filed Oct. 21, 1963

INVENTOR.
Paul T. Mattimoe
BY
Nobbe & Swope
ATTORNEYS

United States Patent Office 3,231,461
Patented Jan. 25, 1966

3,231,461
LAMINATED GLAZING UNIT
Paul T. Mattimoe, Toledo, Ohio, assignor to Libbey-Owens-Ford Glass Company, Toledo, Ohio, a corporation of Ohio
Filed Oct. 21, 1963, Ser. No. 317,616
6 Claims. (Cl. 161—199)

This invention relates generally to improvements in laminated glazing units, and more particularly is concerned with a novel interlayer for use in the production of laminated safety glass and to its method of manufacture.

Laminated safety glass, as employed in the windshields of modern automobiles, is comprised of two sheets of glass integrally bonded together through an interposed layer of plastic. Almost universally the plastic interlayer material employed is polyvinyl butyral. Polyvinyl butyral is an elastomeric material which can absorb the energy of an impacting object by undergoing elongation to a degree which is dependent to a considerable extent on the adhesive forces acting between such polyvinyl butyral and the glass. If the adhesion of a plastic interlayer to the glass is maintained at a high level, then the ability of the interlayer to elongate and absorb the energy of an impacting object will be reduced with a consequent decrease in resistance to penetration. On the other hand, if little or no adhesion exists between the interlayer and the glass, then resistance to penetration will be near a maximum. However, as will be readily appreciated, the condition of little or no adhesion cannot be tolerated in automotive safety glass because of the danger to occupants from pieces of flying glass which could become detached from the interlayer when the laminate is broken.

Thus, in laminated glass for automobile windshields there is an optimum level of glass to interlayer adhesion. At this optimum level of adhesion, the interlayer would be permitted to elongate sufficiently to provide good resistance to penetration by blunt objects, such as the human head, while at the same time sufficient adhesion would exist to prevent the detachment of glass particles of any appreciable size.

Up to the present time, the methods available for adjusting or controlling the adhesion of polyvinyl butyral to glass all suffer from serious disadvantages. For example, it has been proposed to accomplish this end by regulating the moisture content of the vinyl butyral interlayer. It has long been known that vinyl butyral plastic of the type used in laminated glass shows a decreased adhesion to glass at higher moisture contents. This plastic can absorb up to 4 to 5 percent water. However, it is ordinarily laminated at a moisture content of between 0.3 and 0.8 percent. By exposing the plastic to high humidities, its moisture content can be increased and it has accordingly been proposed to adjust the moisture content to about 1 percent before laminating as a means of establishing a reduced level of adhesion at which the interlayer will be able to elongate appreciably on impact but not so low that glass particles of a substantial size will become detached.

However, this high moisture approach is difficult to follow in large scale commercial manufacture of windshields because it requires that the laminating operations be carried out under conditions of very high humidity, otherwise the plastic will lose moisture to the surrounding atmosphere during assembly of the windshield. Moreover, laminated glass made with a high moisture content interlayer has been found to be less stable to heat and less durable to wether exposure than laminated glass having an interlayer of lower moisture content. Still further, the control over adhesion obtained by laminating with high moisture content interlayers is not consistently reproducible. Apparently, different lots of the interlayer material react differently to high moisture content with a resulting variable effect on adhesion.

It has now been discovered, and the instant invention is based upon such discovery, that the adhesion of glass to a vinyl butyral plastic can be controlled reproducibly throughout the normal range of interlayer moisture content presently used in the safety glass industry by controlling the alkalinity of the vinyl butyral sheeting. This discovery has enabled the production of novel laminated glazing units possessing an optimum level of glass to interlayer adhesion. In the above connection, it should be understood that the terms "alkalinity," "titer" or "alkaline titer," when used herein and in the appended claims in identifying or describing vinyl butyral resin, may be defined as the number of milliliters of .01 normal acid required to neutralize 100 grams of the resin using bromphenol blue as the indicator.

It is, therefore, a principal object of the present invention to provide an improved laminated glazing unit.

Another object of the invention is the provision of a novel vinyl butyral interlayer for use in the manufacture of laminated safety glass.

It is another object of the invention to provide a novel method for treating a vinyl butyral resin to improve its adaptability for use as an interlayer material.

It is a further object of the invention to provide a vinyl butyral plastic sheeting which, when employed as the interlayer material in a laminated glass unit, imparts thereto a greatly improved combination of glass adhesion and resistance to impact penetration properties.

Another object of the invention is the provision of a method of treating polyvinyl butyral resins to control the adhesion thereof to glass without simultaneously sacrificing other desirable properties of the resins.

It is a still further object of the invention to provide a method of the above character wherein the control over the adhesive property of the resins is reproducible.

Other objects and advantages of the invention will become more apparent during the course of the following description when taken in connection with the accompanying drawings.

In the drawings wherein like numerals are employed to designate like parts throughout the same:

Figure 1:
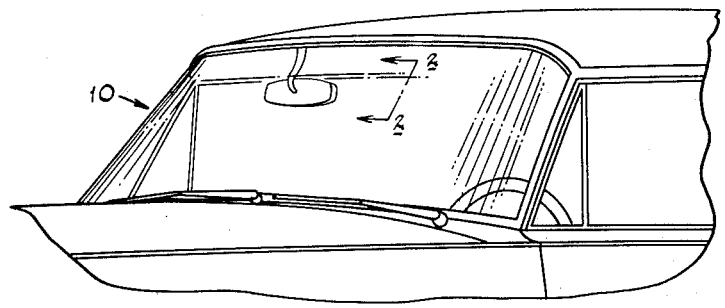
FIG. 1 is a fragmentary, perspective view of an automobile having a windshield comprising the improved laminated glazing unit in accordance with the invention.

In accordance with one aspect of the invention, a process of treating polyvinyl butyral resins to improve their over-all adaptability for use in laminated glazing units is provided. Such process briefly comprises slurrying or otherwise intimately contacting a polyvinyl butyral resin composition with an alkaline reacting compound of an alkali metal, and preferably the hydroxides, carbonates and acetates of sodium, lithium and potassium, for a time sufficient to increase the "alkalinity" or "titer" of such resin to a value in the range of from about 60 to 200. This increase in the alkalinity of the resin has been found to reduce to moderate extent the adhesion to glass of the interlayer formed therefrom while substantially increasing the resistance to penetration of laminates produced with such interlayer. Also, and most importantly, this improved combination of properties may be easily reproduced on a production basis by following the teachings of the present invention, minor differences in the properties and/or composition of the resin to be treated notwithstanding.

The polyvinyl butyral resins to be treated in accordance with the present invention may be formed either by (1) producing polyvinyl alcohol from polyvinyl acetate through the action of an acid or alkaline catalyst and then converting by reaction with butyraldehyde to an acetal through the action of an acid catalyst, or (2) conducting the reactions in a single stage with an acid catalyst, both as are well known in the art. These polyvinyl butyral resins generally contain about 16 to 25 percent hydroxyl groups by weight, calculated as polyvinyl alcohol, less than 3 percent acetate groups, calculated as polyvinyl acetate, and the balance, about 72 to 84 percent by weight polyvinyl butyral.

In addition, the polyvinyl butyral resins treated in accordance with the invention may also have been neutralized. In this connection, the residual acid catalyst in the resin-forming solution is neutralized by the addition thereto of a suitable alkali or alkaline salt. The quantity of the alkaline salt is generally slightly in excess of that required to neutralize the mineral acid catalyst with the resulting resin having an alkalinity or alkaline titer of from about 10 to 30. These neutralized resins, it may be added, are those presently substantially universally commercially employed in the production of safety glass interlayers.

Now, in accordance with the present invention, the above-described polyvinyl butyral resins are treated or, if already neutralized are further treated, with an alkaline reacting compound of an alkali metal. A preferred compound in this respect is potassium hydroxide although the hydroxides of the other alkali metals may be used, such as the hydroxides of sodium, rubidium, cesium or lithium as well as the carbonates and acetates of such metals. Among other basic reacting compounds which have also proven acceptable for use in accordance with the invention may be mentioned the alkali metal salts of formic acid, propionic acid, butyric acid and the like.

The treatment in accordance with the invention comprises slurrying or otherwise intimately contacting the polyvinyl butyral resin with a solution of one of the above-mentioned basic reacting compounds for a time such that, upon recovering the resin by vacuum filtering or centrifuging, drying it, and then dissolving the dried resin in alcohol and titrating the resulting solution with a .01 normal acid solution, the resin shows an alkaline titer of from 60 to 200. Generally, it is preferred to employ a solution of the basic reacting compound having a normality in the range of about 0.01 to 0.05, such solutions usually requiring a slurrying period, with continuous agitation or stirring, of from 4 to 12 hours to derive the required stable titer of 60 to 200.

Upon completion of the above treatment, and in order to produce the improved laminated glazing in accordance with the invention, the treated polyvinyl butyral resin is compounded with a suitable plasticizer. Generally, to be effective in laminated glass under a wide variety of weather conditions, the resins are plasticized with from 40 to 50 parts by weight of plasticizer per 100 parts by weight of resin. The plasticizers most generally used in the laminated glass industry are dibutyl sebacate, triethylene glycol di-2-ethylbutyrate and dibutyl Cellosolve adipate. Other ester plasticizers may be used where special effects are desired. After thorough homogenization of the resin and plasticizer, the admixture is formed into a sheet of predetermined thickness to form a laminate of the strength desired. Thereafter, the resin sheets are assembled with glass sheets and laminated under heat and pressure to produce the finished glazing unit.

The following examples are given in illustration and are not intended as limitations on the scope of this invention. Where parts and percents are mentioned, they are parts and percents by weight unless otherwise indicated.

EXAMPLE I

A polyvinyl butyral resin manufactured by condensing butyraldehyde with polyvinyl alcohol in the presence of a mineral acid catalyst was prepared. As previously mentioned, the technique of manufacturing resins of this type is well known to those skilled in the art whereby it is not believed necessary to describe this process here in detail. Suffice it to say that the polyvinyl butyral resin was the product of such a condensation reaction carried out under conditions of time, temperature and concentration of reactants to yield a product having a chemical composition comprising about 80 percent polyvinyl butyral and 20 percent polyvinyl alcohol. The residual acid catalyst in the resin-forming solution had been neutralized with an alkaline material as is also well known in the art, with the resin showing an alkaline titer value of 25.

To produce an interlayer sheeting having a controlled adhesion in accordance with the invention, the neutralized polyvinyl butyral resin described above was slurried with a solution of potassium hydroxide in water having a normality of 0.025. After stirring for 8 hours, the resin was recovered by vacuum filtering and then dried. When 100 grams of the resin was dissolved in alcohol and titrated with .01 N $H_2SO_4$, the potassium hydroxide treated resin showed a titer value of 103.

One hundred parts of the above potassium hydroxide treated polyvinyl butyral resin was next compounded with 44 parts of 3 GH plasticizer (triethylene glycol di-2-ethylbutyrate) and sheeted on a mill to a thickness of .015 inch.

The resulting sheet of high titer interlayer was laminated with two outer plies of ⅛ inch thick plate glass 12 inches square. This laminate was clear, colorless and heat stable. When tested by immersion in boiling water for two hours no separations, bubbles or other defects were observed. The laminate satisfactorily met all requirements of the A.S.A. Code Z 26.1 for automotive safety glass including the tests for light stability and luminous transmittance.

Additional 12 x 12 inch laminates produced in exactly the same manner as described above were then impacted with a two pound steel ball free falling vertically from a height of 15 feet. The laminates were not penetrated by the ball and only a small number of fine particles of glass separated from the surfaces of the laminate.

For purposes of comparison, similar laminates produced with .015 inch thick conventional low titer interlayers, i.e. having an alkaline titer in the range from 10 to 30, were penetrated by the two pound steel ball at drop heights of only 5 feet.

EXAMPLE II

A neutralized polyvinyl butyral resin having the same composition as that described in Example I and an alkaline titer of 25 was treated in essentially the same manner as disclosed in such latter example except that a .025 N water solution of potassium acetate was substituted for the .025 N potassium hydroxide solution of Example I. Upon titrating an alcohol solution of 100 grams of the treated resin with a .01 N $H_2SO_4$ solution, an alkaline titer of 94 was obtained. Laminates composed of two outer plies of ⅛ inch thick plate glass 12 x 12 inches in size and a .015 inch thick interlayer consisting of the above treated polyvinyl butyral resin and a plasticizer were satisfactory in all respects and all withstood a two pound ball drop test at 10 feet without being penetrated by the ball and without excessive separation of glass particles from the laminates.

EXAMPLES III TO V

Neutralized polyvinyl resins having essentially the same composition as that described in Example I and initial alkaline titers of 20 to 25 were treated in essentially the same manner as disclosed in said Example I except that .025 N water solutions of potassium carbonate and lithium carbonate and a .050 N water solution of sodium acetate, were substituted for the .025 N potassium hydroxide solution of Example I. Alkaline titer values as set forth below were obtained and all laminate samples produced with interlayers formed from the treated high titer resins proved acceptable in all respects and successfully passed, i.e. withstood, the two pound ball drop test at 10 feet without being penetrated by the ball and without excessive separation of glass particles from the laminates.

*Table I*

| Treatment solution: | Titer |
|---|---|
| .025 N potassium carbonate | 94 |
| .025 N lithium carbonate | 112 |
| .050 N sodium acetate | 183 |

Figure 2:
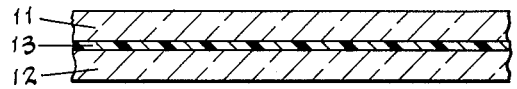
FIG. 2 is an enlarged sectional view taken along the line 2—2 of FIG. 1.

With reference now to the drawings, FIG. 1 illustrates the use of a laminated glazing structure formed in accordance with the invention in an automobile windshield which is indicated generally at 10. As shown in FIG. 2, the windshield consists of two sheets of glass 11 and 12 integrally bonded to an interposed layer 13 of plasticized polyvinyl butyral resin which has been treated, as previously described, to possess an alkaline titer in the range of from about 60 to 200.

In order to even more definitively illustrate the greatly improved properties possessed by structures produced in accordance with the invention, a number of 12 x 12 inch glass laminates consisting of two outer plies of ⅛ inch thick plate glass and a .030 inch polyvinyl butyral interlayer made from resin having an alkaline titer of 81 were made up. These laminates were subjected to break tests with a two pound steel ball at various temperatures over a range of from 0° F. to 120° F. Twenty-five laminates were broken at each of ten different temperatures selected over this range to determine the drop height at each temperature where 50 percent of the laminates failed, i.e. were penetrated by the two pound ball. The results of these tests were compiled and a graph in which the 50 percent failure level of the laminates was plotted against the temperature drawn up. Curve A of FIG. 3 represents these test results as obtained with the improved laminates.

For purposes of comparison, an additional number of 12 x 12 inch glass laminates consisting of two outer plies of ⅛ inch thick plate glass and a .030 inch polyvinyl butyral interlayer made from resin having an alkaline titer of 30 were made up. Tests were then run on these samples using the two pound steel ball to determine the 50 percent failure level drop height thereof. The results of these tests were compiled and are illustrated graphically by curve B of FIG. 3.

Figure 3:
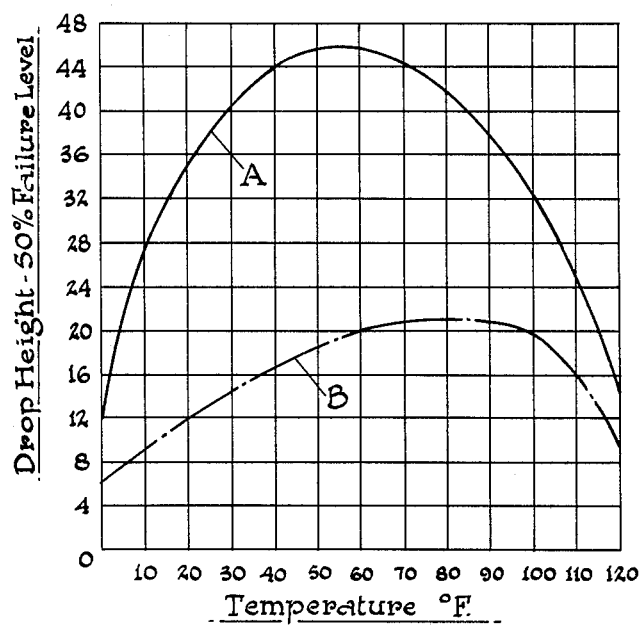
FIG. 3 is a graph showing the 50 percent failure level at various drop heights and temperatures of laminates in accordance with the invention when impacted with a two pound steel ball, and a comparison of such level with that of laminates produced with polyvinyl butyral interlayers not treated in accordance with the invention.

As is clearly illustrated by the curves of FIG. 3, the critical drop heights of the improved laminates are at least twice that of the laminates produced with conventional polyvinyl butyral interlayers over a temperature range of from 0° F. to 80° F. and significantly greater at temperatures from 80° F. to 120° F.

While what has been described is considered to be the more advantageous embodiments of the invention, it will be apparent that modifications and variations can be made in the compositions and specific procedures discussed without departing from the spirit and scope of the present invention, as those skilled in the art will readily understand. Such modifications and variations are considered to be within the purview and scope of the invention as defined by the appended claims.

I claim:

1. A laminated glass unit, comprising two sheets of glass bonded together through an interposed transparent sheet of thermoplastic material consisting essentially of a polyvinyl butyral resin having an alkaline titer in the range of from about 60 to 200, and a plasticizer for said resin, said alkaline titer being defined as the number of milliliters of .01 normal acid required to neutralize 100 grams of the resin using bromphenol blue as the indicator.

2. A laminated glass unit as defined in claim 1, in which the transparent sheet of themoplastic material is approximately .030 inch thick.

3. A laminated glass unit, comprising two sheets of glass bonded together through an interposed transparent sheet of thermoplastic material consisting essentially of a polyvinyl butyral resin containing a quantity of an alkaline reacting compound of potassium sufficient to provide the resin with an alkaline titer in the range of from about 60 to 200, and a plasticizer for said resin, said alkaline titer being defined as the number of milliliters of .01 normal acid required to neutralize 100 grams of the resin using bromphenol blue as the indicator.

4. A laminated glass unit as defined in claim 3, in which said alkaline reacting compound is potassium hydroxide.

5. A laminated glass unit as defined in claim 3, in which said alkaline reacting compound is potassium acetate.

6. An automobile windshield, comprising two sheets of glass, each having a thickness of approximately ⅛ inch bonded together by an interposed transparent layer of thermoplastic material approximately .030 inch thick and consisting essentially of a polyvinyl butyral resin having an alkaline titer in the range of from about 60 to 200, and a plasticizer for said resin, said alkaline titer being defined as the number of milliliters of .01 normal acid required to neutralize 100 grams of the resin using bromphenol blue as the indicator.

References Cited by the Examiner

UNITED STATES PATENTS

| 2,205,020 | 6/1940 | Ryan | 161—199 |
| 2,456,462 | 12/1948 | Stamatoff | 260—73 |
| 2,720,501 | 10/1955 | Van Ness | 260—73 |
| 2,946,711 | 7/1960 | Bragaw et al. | 161—199 |

ALEXANDER WYMAN, *Primary Examiner.*

W. J. VAN BALEN, *Assistant Examiner.*